July 13, 1943. L. J. MARKWARDT 2,323,925
HARDNESS TESTING TOOL
Filed Nov. 12, 1941 3 Sheets-Sheet 1
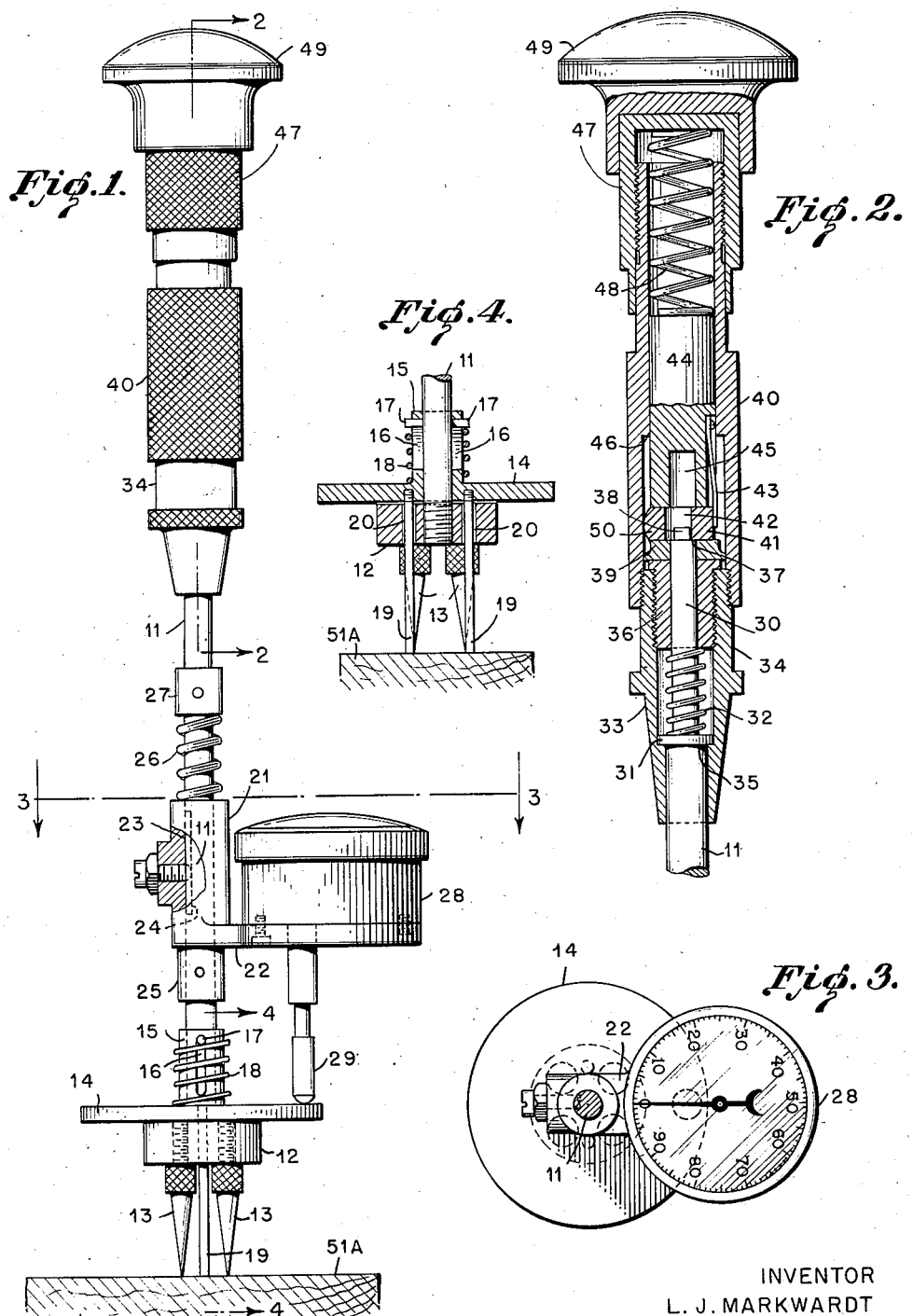
INVENTOR
L. J. MARKWARDT
BY
ATTORNEYS July 13, 1943.  L. J. MARKWARDT  2,323,925
HARDNESS TESTING TOOL
Filed Nov. 12, 1941  3 Sheets-Sheet 2
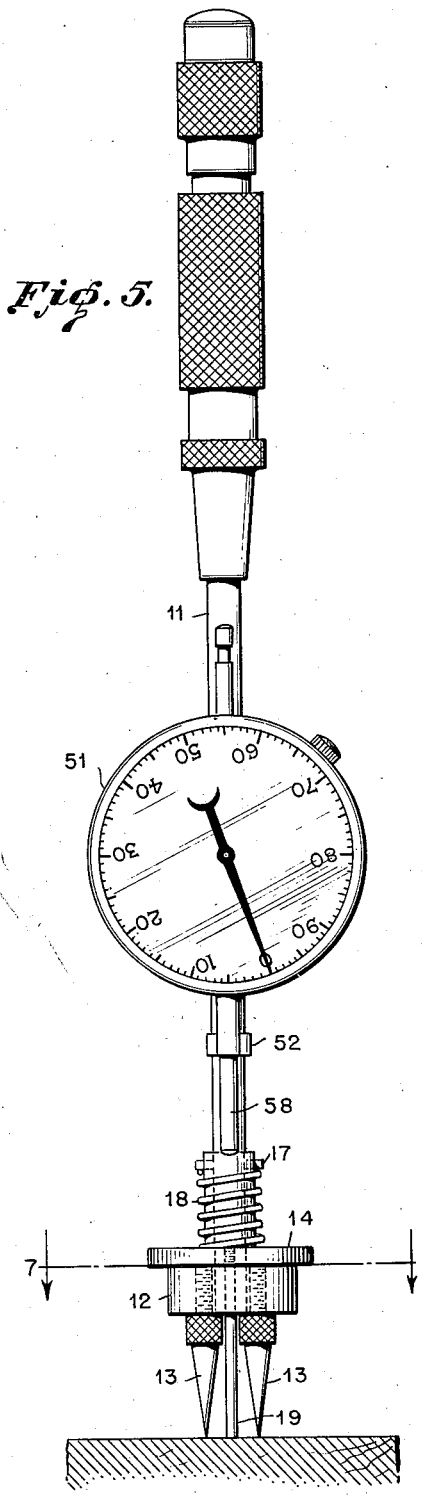
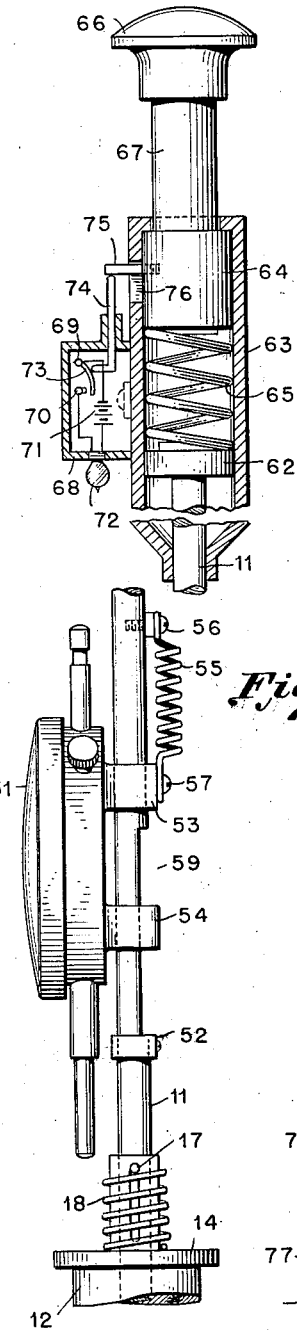
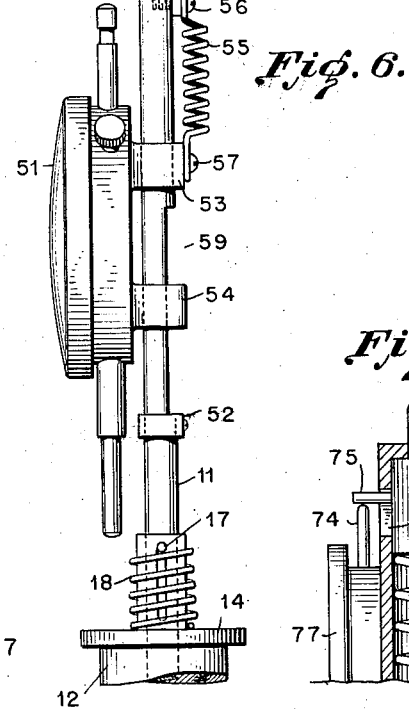
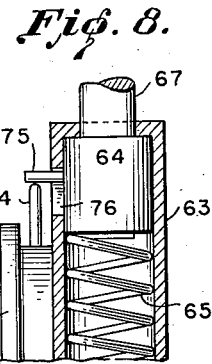
INVENTOR
L. J. MARKWARDT
BY
ATTORNEYS July 13, 1943.  L. J. MARKWARDT  2,323,925
HARDNESS TESTING TOOL
Filed Nov. 12, 1941  3 Sheets-Sheet 3
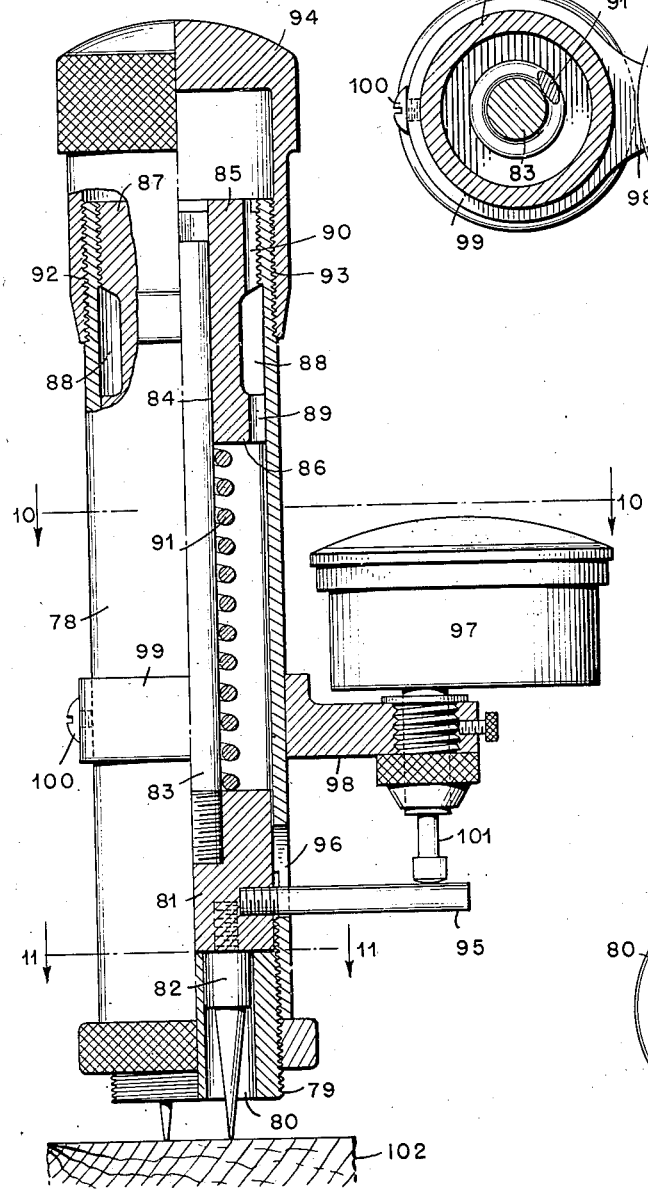
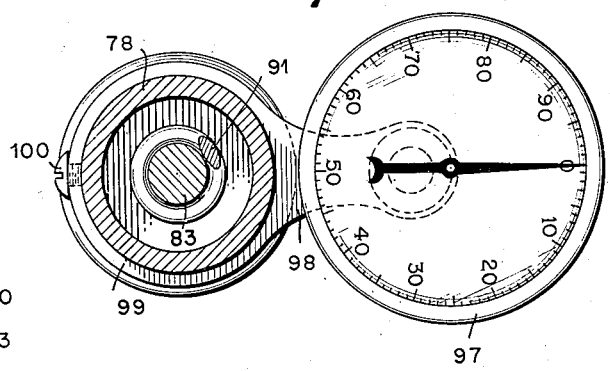
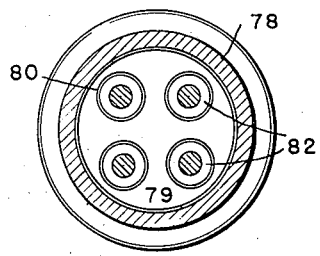
INVENTOR
L. J. MARKWARDT
BY
ATTORNEYS Patented July 13, 1943

2,323,925

UNITED STATES PATENT OFFICE 2,323,925

HARDNESS TESTING TOOL

Lorraine J. Markwardt, Madison, Wis., assignor to Secretary of Agriculture of the United States of America Application November 12, 1941, Serial No. 418,658

7 Claims. (Cl. 265—19)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to devices for testing the hardness of materials, such as wood, plastics, and other non-metallic materials.

The general object of this invention is the provision of a device for testing the hardness of materials of the type mentioned which is portable, which can be operated easily, and by means of which determinations of hardness can be made rapidly and accurately.

The usual method of determining hardness of wood and such other non-metallic materials is to measure the load required to embed a steel ball in the material. The conventional steel ball for this purpose has a standard diameter of 0.444 of an inch and in making the determination it is embedded to one-half of its diameter. This method usually requires the use of a small specimen, which must be cut or otherwise taken from the material to be tested.

A specific object of this invention is the provision of a device of the type mentioned which does not require the removal of such a specimen and which does not materially damage the material. By the use of this invention hardness tests can be made wherever the material is found and whether it is a fixed part of a structure, a growing tree, or otherwise.

Individual pieces of wood differ from one another in density, hardness and other mechanical properties, even those of the same species. One of the many uses of this invention is the grading or classification of individual pieces of wood or other materials during manufacturing processes or at other times, according to hardness and hence density, strength and mechanical properties. Conversely, it may be used for determining the softness of wood, as for instance, when soft or weak pieces are desired for carving or for other purposes. Also, it is useful in segregating pieces of wood that have become softened by decay or other agencies.

In general, this invention departs from the conventional practice of measuring the force required to embed a steel ball in a specimen of the material and provides a device having metallic points adapted to penetrate the material to be tested under a given load. The depth of penetration under this given load is measured as a factor inversely related to the hardness. The small indentures made by these points will not ordinarily detract from the value or usefulness of the materials tested.

The following description, considered together with the accompanying drawings, will disclose this invention more fully, its construction, arrangements and combinations of parts and other objects and advantages thereof will be apparent.

In the drawings:

Figure 1 is a side elevational view of an embodiment of this invention poised on a piece of material to be tested.

Figure 2 is a section along the line 2—2 of Figure 1.

Figure 3 is a plan view from the line 3—3 of Figure 1.

Figure 4 is a section along the line 4—4 of Figure 1.

Figure 5 is a front elevational view of a modified embodiment of this invention.

Figure 6 is a fragmentary side elevational view of the modified embodiment illustrated in Figure 5.

Figures 7 and 8 are longitudinal sections of further modifications of this invention which may be used in either the embodiment illustrated in Figures 1, 2, 3, and 4 or the embodiment illustrated in Figures 5 and 6.

Figure 9 is a side elevational view, partly in section, of a third embodiment of this invention.

Figure 10 is a section along the line 10—10 of Figure 9.

Figure 11 is a section along the line 11—11 of Figure 9.

Referring with more particularity to Figures 1, 2, 3, and 4, the embodiment illustrated comprises a shaft or rod 11, to the lower end of which is secured a block 12. To the bottom of the block 12, pins 13, each tapered downwardly to a point in a common plane, are secured parallel to the axis of the rod 11. The points of the pins 13 may be either pointed, as illustrated, or in some other form, such as a ball or flat surface, or any variation of these forms. Above the block 12, a plate 14, integral with a sleeve 15, is slidably mounted on the rod 11. The slidable movement of the plate 14 on the rod 11 is limited by means of longitudinal slots 16 of the sleeve 15 engaging pin 17 projecting from the rod 11. The pins 17 project beyond the sleeve 15 to abut the upper end of a coil spring 18 under compression about the sleeve 15, the lower end of the said spring abutting the plate 14. To the bottom of the plate 14 posts 19 are fixed and they extend through apertures 20 in the block 12, terminating at the lower end in the same plane as the ends of the pins 13 when the block 12 and plate 14 are in contact.

Above the sleeve 15 there is slidably mounted on the rod 11 a sleeve 21 integral with an outwardly extending bracket 22. The sleeve 21 is prevented from turning by means of a spline key 23 on the sleeve 21 engaging a longitudinal slot 24 on the side of the shaft 11. The sleeve 21 is held downward against a fixed collar 25 on the shaft 11 by means of a coil spring 26 in compression about the rod 11 between the top of the sleeve 21 and a fixed collar 27 thereabove. The bracket 22 carries a displacement gauge 28, the operator 29 of which is normally in contact with the top of plate 14.

On top of the rod 11 a trip mechanism is provided which may be of any suitable conventional type. The mechanism illustrated comprises an extension 30 of the rod 11 and a flange 31 at the base of the extension. A spring 32 is disposed about the extension 30 on the flange 31. The lower end of the lower section 33 of a tubular casing 34 is disposed about the upper end of the shaft 11 and is provided with an annular shoulder 35 to abut the lower end of the flange 31. The upper end of the section 33 extends to a point above the spring 32, into which there is screwed a barrel 36 about the extension 30 to abut the upper end of the spring 32.

The upper end of the extension 30 is recessed to provide an upwardly facing shoulder 37 and leave a small tip 38 at the top. A ring 39 rests on top of the barrel 36 and its top is normally flush with the shoulder 37. An upper section 40 of the tubular casing 34 is secured at the bottom to the section 33 by means of threads, substantially as shown. On top of the ring 39 a tumbler 41 is disposed to slide laterally and is provided with an aperture 42 large enough to receive the extension 30. The outside width of the tumbler is less than the inside diameter of the casing section 40 at that point and normally the tumbler is held against one side of the section 40 so that the aperture 42 is eccentric to the extension 30 and engages the shoulder 37 on one side as illustrated. The tumbler is yieldably held in this position by the lower end of a leaf spring 43, the upper end of which is fastened to a bar 44 resting on top of said tumbler. The lower end of the bar 44 is provided with a longitudinal cavity 45, aligned with and of the same size as or slightly larger in diameter than the extension 30. The inner diameter of the section 40 at a point above the cavity 45 is reduced and is in slidable relation with the bar 44. This reduction in diameter provides a shoulder 46 downwardly facing. The section 40 extends upward beyond the end of the bar 44 and is provided with a cap 47 threadedly engaged therewith. Between the cap 47 and the upper end of the bar 44 a spring 48 is disposed for compression. On the cap 47 a knob 49 is fixed to permit the manual application of force downwardly. The side 50 of the tumbler 41, in contact with the casing section 40, is curved convexly so that a force applied downwardly thereon will move it inwardly to align the aperture 42 with the extension 30.

The embodiment described above is operated by placing it, as shown in Figure 1, with the bottom of the posts 19 and the points of the pins 13 resting on the surface of the material to be tested, such as the piece of wood 51. The operator then applies a downward force on the knob 49 which is transmitted through the spring 48, bar 44, and tumbler 41 to the shoulder 37 of the extension 30, and thence through the rod 11 to the pins 13 on the block 12, which tends to force the points of these pins in the material being tested while the posts 19 hold the plate 14 stationary. The force applied on the knob 49 is increased and the casing 34 moves downward, the section 40 moving over the bar 44 and the section 33 over the shaft 11 as compression in the spring increases. As the casing 44 moves downward the shoulder 46 contacts the convex side 50 of the tumbler 41 and forces it laterally against the action of the spring 43 until the aperture 42 is in alignment or registry with the extension 30 and cavity 45. This permits the energy stored up in the spring 48 to force the bar 44 and tumbler 41 down over the end of the extension 30. The end of the extension 30 passes through the aperture 42 into the cavity 45 and receives a blow on the tip 38 by the bar 44 at the upper end of the cavity 45. Since the initial distance between the tumbler 41 and shoulder 46 is fixed, the energy stored up in the spring 48 at the time shoulder 37 is disengaged from the tumbler will be constant and the same force is always delivered to the pins 13 upon each application. The magnitude of this force, however, can be varied by turning the cap 47 relative to the section 40 on the threads by which they are engaged. Consequently, the distance to which the pins 13 are embedded in the material is a function of its hardness. This distance is the same as the displacement between the shaft 11 movable with the pins 13, and the plate 14 held stationary by the posts 19. The relative movement between the shaft 11 and plate 14 actuates the operator 29 of the gauge 28 which indicates the displacement in terms of hardness. As the shaft 11 moves downward relative to the plate 14, the spring 18 is compressed and when the pins 13 are removed from the material tested, the spring 18 returns the plate to its initial position. The spring 26 is strong enough to hold the sleeve 21 on the collar 25 against the upward force of the plate 14 acting through the gauge 28. The purpose of the spring 26 is to cushion the shock of the blow delivered to the rod 11 and prevent damage to the delicate mechanism in the gauge 28.

As force is applied on the knob 49, the casing 34 moves downward relative to the shaft 11. The flange 31 moves toward the barrel 36 compressing the spring 32. After the blow is delivered to the end of the extension 30 and the knob 49 released, the spring 32 returns the flange 31 to its initial position against the shoulder 35. The extension 30 is thus retracted from the cavity 45 and tumbler 41 which is moved laterally under the action of the spring 43 to engage the shoulder 37.

In Figures 5 and 6 a modified form of the invention is illustrated. In this modification the dial gauge 51 is slidably mounted on the shaft 11 above a fixed collar 52 by means of sliding brackets 53 and 54 and is held in a suspended position by means of a spring 55 fastened at one end to the shaft 11 by means of a screw 56 and at the other end to the bracket 53 by means of a screw 57. That portion of the rod 11 on which the bracket 54 slides has a flat side 59 which is engaged by the bracket 54 to prevent its turning on the shaft. The operator 58 of the dial gauge 51 projects downward to a point above the stationary plate 14 at a distance equal to the distance between the bracket 54 and the collar 52 so that in the initial position when the dial gauge is moved down on the shaft 11 against the action of the spring 55, the lower end of the operator 58 will contact the plate 14 at the same time when bracket 54 contacts the collar 52. Consequently, after the pins 13 are embedded in the material being tested, the relative displacement between the shaft 11 and plate 14 can be determined by sliding the dial gauge 51 downward until the bracket 54 contacts the collar 52.

In Figure 7 a further modification of this invention is shown comprising a substitution for the tripping mechanism described above. The upper end of the rod 11 in this modification terminates in a flange 62 slidable in a cylindrical casing 63. Above the flange 62 a piston 64 is also slidably mounted in the casing 63. Between the piston 64 and flange 62 a spring 65 is disposed. The piston 64 is adapted to be forced downward manually by means of a knob 66 connected to the piston by a connecting bar 67 through the top of the casing 63. On the exterior of the casing 64 a limit switch is mounted in a housing 68. The housing 68 is fastened to the casing 63 and contains a pair of electrical terminals 69 and 70. The terminal 69 is connected to one pole of a battery 71 and the other terminal 70 is connected to one terminal of an incandescent bulb 72 mounted on the outside of the housing 68. The other terminal of the bulb 72 is connected to the other pole of the battery 71. The terminal 69 is secured to one end of a switch contact element 73, such as a piece of spring steel. The other end of the element 73 is free and is adapted to contact the terminal 70 when it is pushed downward a predetermined distance against its internal spring action. This is accomplished by means of a plunger 74 slidably disposed through the top of the housing 68. This plunger contacts the member 73 and is normally held upward thereby in contact with a pin 75 projecting laterally from the piston 64 through a longitudinal slot 76 in the casing 63. As the piston moves downward relative to the casing 63, the pin 75 moves with it and urges the plunger 74 downward, which in turn forces the free end of the member 73 to move toward the terminal 70. When the member 73 touches the terminal 70 it completes the circuit between the battery 71 and bulb 72. The glow of the bulb indicates to the operator pushing on the knob 66 that a predetermined force has been applied to the shaft 11 through the spring 65. The gauge is then read to determine the hardness of the material being tested. These means for applying a force of predetermined magnitude may be used with either the embodiment illustrated in Figures 1, 2, 3, and 4, or the embodiment illustrated in Figures 5 and 6. If desired, the limit switch can be replaced by another dial gauge 77 as shown in Figure 8, so that instead of using the instrument to measure the distance of penetration under a given load, it can be used to measure the force required to penetrate the pins to a predetermined distance. In using this modification, the operator would observe the dial gauge which indicates depth of penetration until a predetermined depth is reached, and then take the reading from the gauge 77 as an indication of the force required to embed the points and hence as an index of the hardness of the material.

The embodiment illustrated in Figures 9, 10 and 11 comprises a tubular casing 78, at the bottom of which is secured a cylinder 79 having longitudinal apertures 80 therethrough, preferably four. Above the cylinder 79 another cylinder 81 is disposed which is slidable longitudinally within the casing 78. To the bottom of the movable cylinder 81 push pins 82 tapering downwardly are secured, there being one pin for each aperture 80. The pins 82 are adapted to reciprocate through the apertures 80 and normally project below the bottom of the casing 78 a predetermined distance to a common plane. The lower end of a guide rod 83 is secured to the movable cylinder 81 and the upper end of said rod slidably operates in a longitudinal aperture 84 of a spool-like member 85. The member 85 has a lower annular flange 86 against the inner surface of the casing 78 and an upper threaded flange 87 adapted to engage internal threads at the upper end of the casing 78 to hold it securely in position. The annular space 88 between the two flanges 86 and 87 is for the retention of lubricating oil which feeds through a small passage 89 of the lower flange 86 adjacent to casing 78, and which is introduced through another passage 90 of the upper flange 87 also adjacent to casing 78. About the rod 83 between the spool 85 and cylinder 81, a coil spring 91 is disposed. The top of the casing 78 on the outer side is provided with external screw threads 92 for engaging the internal threads 93 of a removable cap 94.

A pin 95 is fixed at one end to the cylinder 81 and extends outward laterally through a longitudinal slot 96 in the side of the casing 78. Above the pin 95 a dial gauge is mounted on a bracket 98 having a band 99 encircling the casing 98 and secured to it by means of a set screw 100. The operator 101 of the dial gauge extends downward to abut the top of the pin 95. To use the device, the pins 82 are set on the surface of the material to be tested, such as the piece of wood 102 shown in Figure 9, and a downward force is applied on the cap 94 causing the casing 78, together with the spool 85, to move downward and load the spring 91. The force of the spring acting downward against the cylinder 81 tends to sink the pins 82 into the material being tested. The application of force on the cap 94 is continued until the bottom of the cylinder 79 contacts the surface of the material being tested. The distance to which the pins 82 become embedded depends upon the hardness of the material being tested. This is determined by the displacement from the initial position between the pins 82 and the casing, as indicated by the gauge 97, when the bottom of the cylinder 79 is in contact with the surface of the material. For very soft materials relative displacement between the casing and the pins from the initial position would be small and for hard materials such displacement would be correspondingly greater. This displacement being an index of the hardness, the gauge 97 is graduated in units of hardness so that readings can be taken directly without computation.

Having thus described my invention, I claim:

1. A device for determining the hardness of materials comprising a test head carrying a group of pins adapted to penetrate the material to be tested, means for applying a force of predetermined magnitude on said head to force said pins into the material, and means for determining the distance to which said pins penetrate the material as an index of the hardness thereof.

2. A device for determining the hardness of materials comprising a test head carrying a group of pins adapted to penetrate the material to be tested, means for applying a force of predetermined magnitude on said head to force said pins into the material, a displacement gauge movable with said head, said gauge having a dependent operator, and means for holding said operator in a fixed position when said gauge moves with said head.

3. A device for determining the hardness of materials comprising a shaft, pins fixed to the end of said shaft, said pins being adapted to penetrate the material to be tested, a slidable member on said shaft, posts for supporting said member in a stationary position over the material to be tested, relative to said pins, a displacement gauge movable with said shaft, said gauge having a dependent operator abutting said slidable member so as to be held stationary therewith, and means for applying a force of predetermined magnitude on said shaft to force said pins into the material to be tested.

4. A device for determining the hardness of materials comprising a shaft, pins fixed to the end of said shaft, said pins being adapted to penetrate the material to be tested, a displacement gauge on said shaft movable therewith, said gauge having an operator, means for holding said operator in a fixed position when said gauge moves with said pins, means for applying a sudden force of predetermined magnitude on said shaft in the direction of said pins, and yieldable means to cushion said gauge from the shock of said sudden force.

5. A device for determining the hardness of materials comprising a test head carrying a group of pins adapted to penetrate the material to be tested, means for manually applying a force on said head to push said pins into the material a predetermined distance, and means for measuring the magnitude of the force required therefor as an index of the hardness.

6. A device for determining the hardness of materials comprising an elongated casing, pins longitudinally movable within the casing, the points of said pins projecting outwardly through one end of the casing a predetermined distance, a spring opposing retraction of the pins within the casing, and means for determining relative displacement between said casing and said pins.

7. A hardness testing hand tool, comprising an elongated casing, a plurality of tapered pins longitudinally movable within the casing, the points of said pins lying in a common plane and projecting outwardly through one end of the casing a predetermined distance, said casing having longitudinal slideways through the end thereof, one for each pin, to slidably engage and guide said pins, a cylinder slidable in said casing, said pins being secured to said cylinder, a longitudinal shaft having one end secured to said cylinder, a spool secured within said casing, said spool being longitudinally spaced from said cylinder, means for adjusting the longitudinal position of said spool, said spool having a longitudinal aperture therethrough, said shaft being slidably engaged with said aperture of said spool, a coil spring disposed about said shaft between said spool and said cylinder, a gage secured to said casing, said gage having an operator to actuate the mechanism thereof, a bar secured to said cylinder and engaged with said operator, said casing having a slot through which said bar projects to engage said operator.

LORRAINE J. MARKWARDT.